US012469146B2

(12) United States Patent
Kansara et al.

(10) Patent No.: US 12,469,146 B2
(45) Date of Patent: Nov. 11, 2025

(54) SYSTEMS AND METHODS FOR AUTOMATED VIDEO MATTING

(71) Applicant: NETFLIX, INC., Los Gatos, CA (US)

(72) Inventors: Apurvakumar Dilipkumar Kansara, Los Gatos, CA (US); Yiwei Zhao, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 420 days.

(21) Appl. No.: 18/069,202

(22) Filed: Dec. 20, 2022

(65) Prior Publication Data

US 2024/0202932 A1 Jun. 20, 2024

(51) Int. Cl.
| | | |
|---|---|---|
| *G06T 7/194* | (2017.01) | |
| *G06V 10/44* | (2022.01) | |
| *G06V 10/56* | (2022.01) | |
| *G06V 10/74* | (2022.01) | |
| *G06V 10/762* | (2022.01) | |

(52) U.S. Cl.
CPC ............ *G06T 7/194* (2017.01); *G06V 10/44* (2022.01); *G06V 10/56* (2022.01); *G06V 10/761* (2022.01); *G06V 10/762* (2022.01); *G06T 2207/10024* (2013.01); *G06T 2207/20101* (2013.01)

(58) Field of Classification Search
CPC .......... G06T 7/194; G06T 2207/10024; G06T 2207/20101; G06T 2207/10016; G06T 2207/20084; G06T 7/11; G06V 10/44; G06V 10/56; G06V 10/761; G06V 10/762
USPC ........................................................ 382/164
See application file for complete search history.

(56) References Cited

U.S. PATENT DOCUMENTS

| | | | | |
|---|---|---|---|---|
| 6,674,907 | B1* | 1/2004 | Shum ...................... | G06V 10/56 |
| | | | | 382/164 |
| 2011/0164284 | A1* | 7/2011 | Dai ....................... | H04N 1/4072 |
| | | | | 358/3.06 |
| 2015/0003725 | A1* | 1/2015 | Wan ......................... | G06T 7/11 |
| | | | | 382/154 |
| 2017/0358092 | A1* | 12/2017 | Bleibel .................. | H04N 5/272 |
| 2022/0222791 | A1* | 7/2022 | Zhang ..................... | G06T 5/40 |

(Continued)

OTHER PUBLICATIONS

International Search Report and Written Opinion mailed Mar. 6, 2024, for International Application No. PCT/US2023/081978; 12 pages.

(Continued)

*Primary Examiner* — Ali Bayat
(74) *Attorney, Agent, or Firm* — Greenberg Traurig, LLP

(57) ABSTRACT

The disclosed computer-implemented method may include receiving an instruction to distinguish a foreground subject within an image from a background of the image based at least in part on a trimap of the image; determining, for each of the indeterminate pixels, using a chromatic-spatial distance metric, a distance of the indeterminate pixel from one or more of the foreground pixels and a distance of the indeterminate pixel from one or more of the background pixels; and recategorizing a subset of the indeterminate pixels as background pixels based at least in part on the subset of indeterminate pixels being closer to the one or more background pixels than to the one or more foreground pixels according to the chromatic-spatial distance metric. Various other methods, systems, and computer-readable media are also disclosed.

18 Claims, 9 Drawing Sheets

(56) References Cited

U.S. PATENT DOCUMENTS

2022/0358675 A1* 11/2022 Chen .................... G06T 7/75

OTHER PUBLICATIONS

Gui-Lin Yao, "A Survey on Pre-Processing in Image Matting", Journal of Computer Science and Technology, vol. 32, No. 1, Jan. 2017, pp. 122-138, DOI: 10.1007/s11390-017-1709-z; 17 pages.

Syu Jia-Hao et al., "A Patch-Based Contraction Process for the Improvement of Image Matting", International Symposium on Intelligent Signal Processing and Communication Systems, Xiamen, China, Nov. 6-9, 2017, IEEE p. 559-564; 6 pages.

* cited by examiner

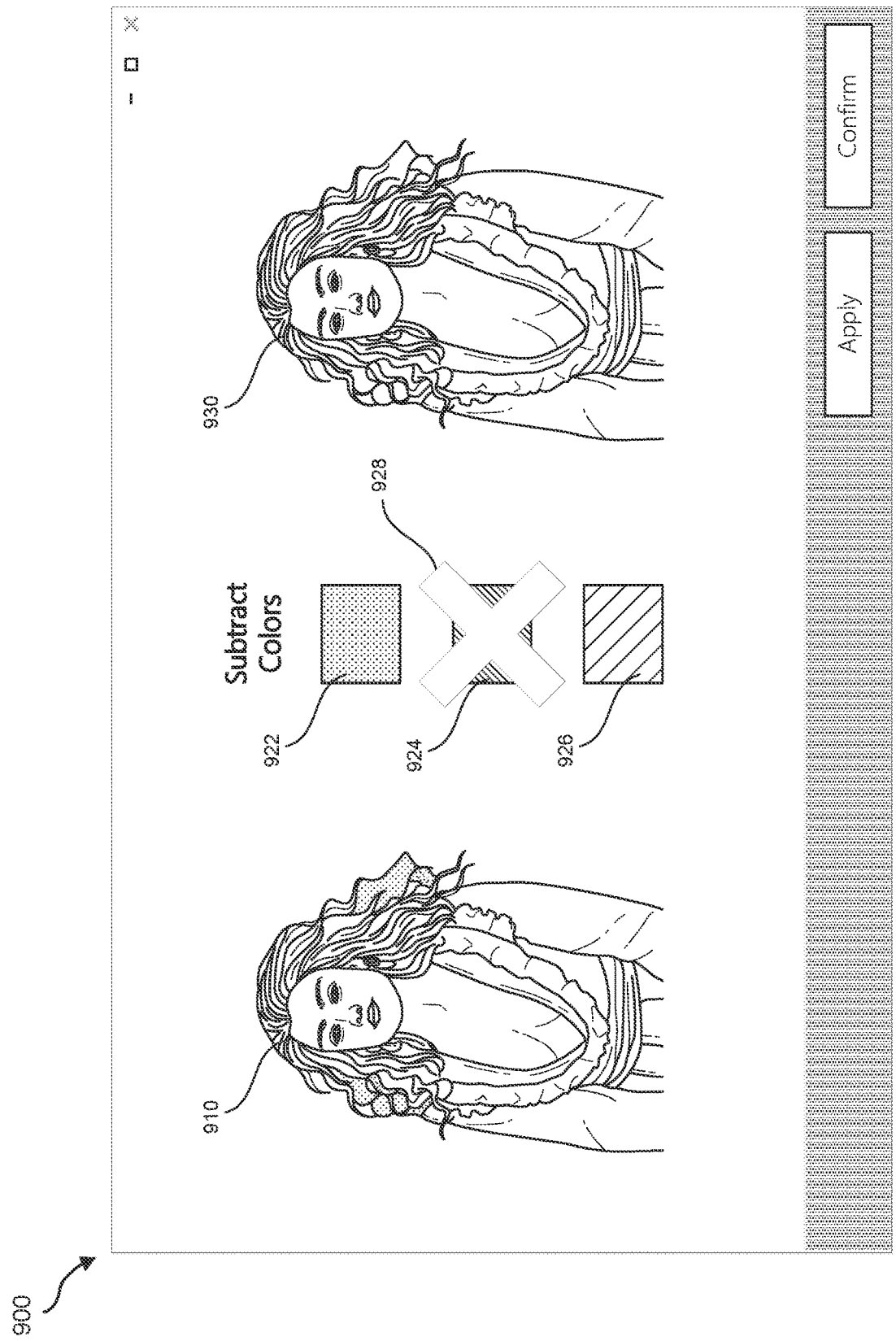

SYSTEMS AND METHODS FOR AUTOMATED VIDEO MATTING

BACKGROUND

In filmmaking, "visual effects" (VFX) refers to a collection of techniques for manipulating imagery in video. Many VFX techniques involve isolating a subject within the video imagery (e.g., from the background). For example, a pixel map can define which pixels within a video frame pertain to the subject (and which pertain to the background). Once the subject is isolated, a variety of editing techniques can be applied to the subject (or to the background) in isolation, including removing the subject, moving the subject, changing the background against which the subject is portrayed, or applying effects to the subject alone.

Unfortunately, the process of isolating a subject within a video can be very labor intensive, as VFX artists may manually inspect individual pixels of each video frame to determine whether they pertain to the subject. When the subject is a person, fine details such as hair may be tedious to isolate from the background. Moreover, semi-automated tools for isolating a subject may be error-prone and characteristically bad at handling such fine details, while still often requiring intensive labor.

SUMMARY

As will be described in greater detail below, the present disclosure describes systems and methods for automated video matting. To improve the classification of subject pixels and background pixels, an automated keying technique may be applied to a group of indeterminate pixels. First, the group of indeterminate pixels may undergo a color reduction (e.g., via an unsupervised clustering process). Then, the "distance" between the indeterminate pixels and one or more known subject pixels and between the indeterminate pixels and one or more known background pixels may be calculated. Here, "distance" may refer to a combination of spatial distance between the pixels and color difference between the pixels. Indeterminate pixels may therefore be classified based on whether they are "closest" to one or more subject pixels or to one or more background pixels.

In some examples, a user feedback process may allow a user to select one or more colors from the reduced palette of intermediate pixels to indicate that a color is a subject color (and not a background color), or vice versa. Thus, for example, a user may override initial estimations (e.g., based on the "distance" calculations) of whether indeterminate pixels pertain to the subject or the background. In addition, an iterative learning process, based on the user feedback, may apply the automated keying to successive frames of a video with improved accuracy.

The initial classification of some pixels as indeterminate pixels (rather than, e.g., known subject pixels or known background pixels) may be accomplished in a number of ways. For example, indeterminate pixels may be identified manually (e.g., via a brush tool applied by the user to relevant parts of a frame) or automatically. Automated identification of the indeterminate pixels may involve use of a machine learning model trained on a corpus of images with corresponding trimaps (pixels maps classifying pixels of each image as being known subject pixels, known background pixels, or indeterminate).

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 9 is an illustration of an exemplary user interface for automated video matting.

Figure 1:
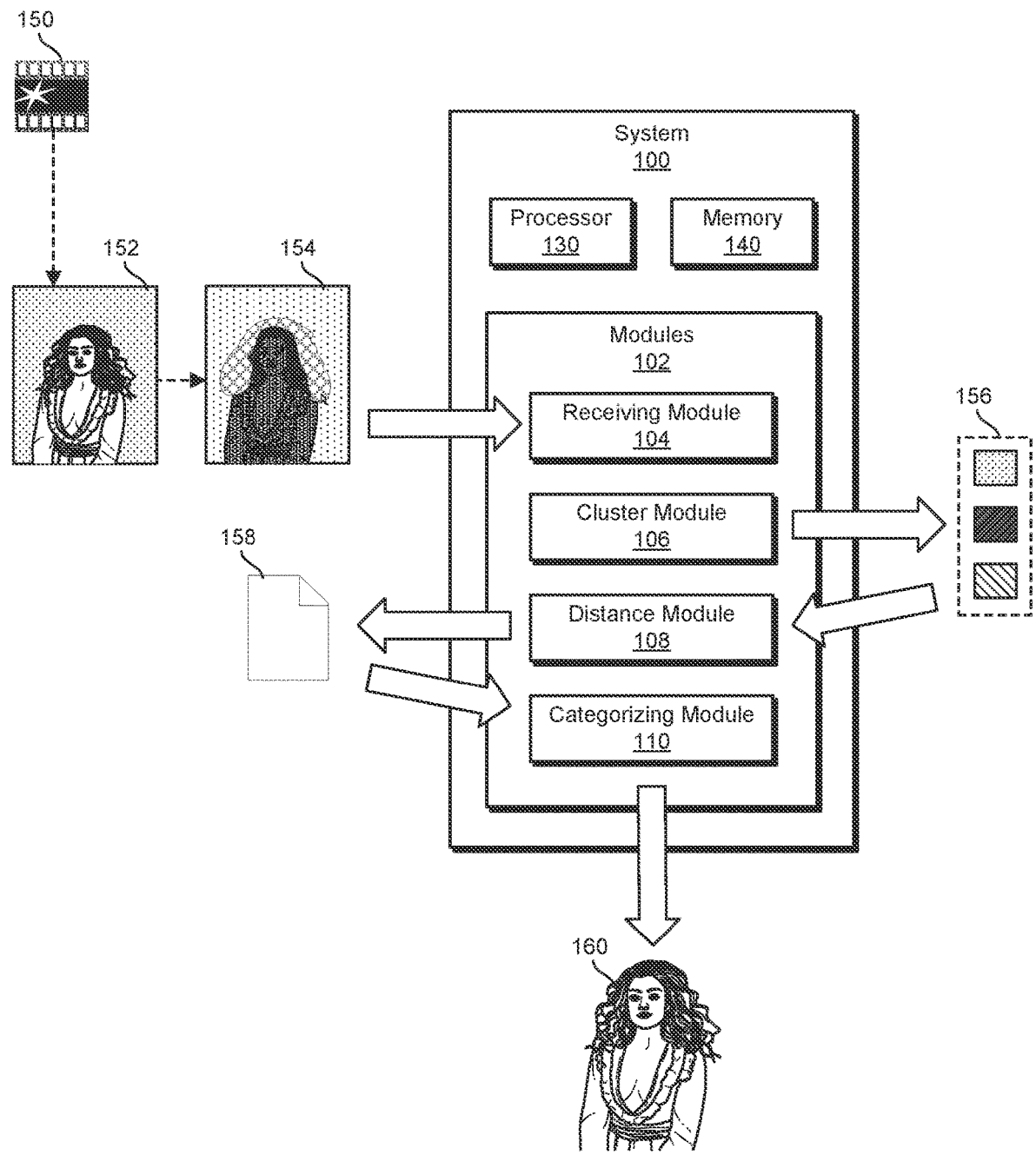
FIG. 1 is a block diagram of an exemplary system for automated video matting.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for automated video matting. As will be explained in greater detail below, embodiments of the present disclosure may apply a chromatic-spatial distance metric to color-reduced indeterminate pixels of an image (such as a video frame) to determine whether the indeterminate pixels are "closer" to—and, thus, pertain to—a subject within the image or the background of the image.

Applying the systems and methods described herein to one or more images (e.g., frames of a video) may result in the automated generation of video mattes (e.g., alpha mattes that separate the subject from the rest of the video) with high accuracy and very little user input, intervention, or error correction. In some examples, a user-facing process may include the user selecting one or a few points of a single frame to select a subject within the frame (and, optionally, scribble an input to indicate one or more regions of indeterminate pixels), after which the systems and methods described herein may quickly and accurately generate an alpha matte of the subject across an arbitrary number of frames. In some examples, the user may have an opportunity to adjust automated keying decisions of the systems and methods described herein by, e.g., selecting one of a few color clusters to include in rather than subtract from the subject. These systems may learn from the user feedback on subsequent frames.

Furthermore, the systems and methods described herein for automated keying may successfully handle indeterminate pixels in contexts with intricate and/or fine details, such as the edges of hair. This may allow for quick and accurate matting for those aspects of video frames that may otherwise be the most difficult, labor-intensive, and error-prone.

Systems described herein may improve the functioning of a computer by improving the video editing, visual effects capabilities, and video matting capabilities of the computer by accurately converting a video and trimap into an alpha matte. The systems and methods described herein may also represent an improvement to the fields of video editing and visual effects by improving the efficiency and accuracy of video matting.

The various embodiments mentioned above and additional embodiments will be described in greater detail below with regard to computing system 100 of FIG. 1, computer-implemented method 200 of FIG. 2, and the embodiments depicted in FIGS. 3-9.

FIG. 1 illustrates a computer system 100. The computer system 100 includes software modules, embedded hardware components such as processors, or a combination of hardware and software. The computer system 100 is substantially any type of computing system including a local computing system or a distributed (e.g., cloud) computing system. In some cases, the computer system 100 includes at least one processor 130 and at least some system memory 140. The computer system 100 includes program modules 102 for performing a variety of different functions. The program modules are hardware-based, software-based, or include a combination of hardware and software. Each program module uses computing hardware and/or software to perform specified functions, including those described herein below.

Computer system 100 may include a receiving module 104 that is configured to receive an instruction to distinguish a foreground subject within an image 152 from a background of the image based at least in part on a trimap 154 of the image. As used herein, the term "image" may refer to any digitally represented image. In some examples, image 152 may be a frame of a digital video 150 and/or derived from the frame of a digital video. As used herein, the term "foreground subject" (or "foreground") may refer to any distinct entity represented within an image. For example, the term "foreground subject" may refer to the visual representation of a person, an object, a visually coherent group of objects, and/or any visually coherent and/or integral visual phenomenon. While the foreground subject may typically be mostly or completely in the foreground of the image, in some examples other imagery within the image may appear closer to the "front" of the image (e.g., closer to camera) than the foreground subject, including, in some examples, visual elements that may partly obscure the foreground subject within the frame. Nevertheless, the term "foreground subject" as used herein may apply to such cases.

As used herein, the term "background" may refer to one or more visual elements within an image apart from the foreground subject. In some examples, the term "background" may refer to the entirety of the image apart from the foreground subject. In various examples, the background may include an environment within which the subject is observed, other people, other objects, etc. As noted above, in some examples visual elements that are not part of the foreground subject may appear closer in perspective to the viewer than does the foreground subject and/or may partly obscure the foreground subject. Nevertheless, the term "background" as used herein may apply to such visual elements.

As used herein, the term "trimap" may refer to any categorization scheme that distinguishes various parts of an image into three categories: part of the foreground subject, part of the background subject, or indeterminate. In some examples, a trimap may be implemented as a pixel map—e.g., each pixel of the image being categorized as a foreground subject pixel, a background pixel, or an indeterminate pixel. In other examples, the trimap may be represented by other data structures that are reducible to one or more pixel maps.

In some examples, a trimap may discretely categorize each pixel of an image as a foreground pixel, a background pixel, or an indeterminate pixel. In other examples, a trimap may assign weights and/or probabilities for one or more of the categories. For example, a trimap may store an initial probability assigned to each pixel being a foreground pixel or a background pixel. In some examples, in addition to a categorization and/or weight assigned to a pixel as a foreground and/or background pixel, the trimap may store a weight indicating a degree of indeterminacy of the pixel's status. Thus, in various embodiments discussed herein, a pixel may be treated as a foreground pixel if, e.g., a probability or weight assigned to the pixel being a foreground pixel is above a predetermined threshold (e.g., 50%, 95%, etc.) and/or is above a probability or weight assigned to the pixel being a background pixel (e.g., by any amount or by a predetermined amount). Additionally or alternatively, in some contexts, calculations involving the pixel as a foreground pixel may be weighted according to the weight and/or probability assigned to the pixel as a foreground pixel.

Computer system 100 may also include a cluster module 106 that clusters the indeterminate pixels identified in trimap 154 by color into a reduced set of colors 156. While FIG. 1 depicts three colors in reduced set of colors 156, reduced set of colors 156 may include any number of colors (e.g., 2, 5, 10, etc.). As will be explained in greater detail below, systems and methods described herein may use reduced set of colors 156 in place of the actual colors of the indeterminate pixels when making estimations about the categorization of the indeterminate pixels.

Computer system 100 may additionally include a distance module 108 that determines, for each of the indeterminate pixels, using a chromatic-spatial distance metric, a distance of the indeterminate pixel from one or more of the foreground pixels and a distance of the indeterminate pixel from one or more of the background pixels, the chromatic-spatial distance metric aggregating a color distance and a spatial distance. Thus, distance module 108 may produce a set of distances 158 that account for all of the indeterminate pixels of image 152. As used herein, the term "distance metric" may refer to any metric for calculating a difference and/or distance between two points, vectors, and/or data structures. Thus, for example, district metrics described herein may be Euclidean or non-Euclidean; linear or non-linear; singular or composite; etc. The term "chromatic-spatial distance metric," as used herein, may refer to any distance metric that takes into account position (e.g., position of a pixel within an image) and color (e.g., color of a pixel and/or reduced color of a pixel). In some examples, a chromatic-spatial distance metric may include other measurements of relative difference and/or distance between two pixels and/or two groups of pixels.

Computer system 100 may further include a categorizing module 110. Categorizing module 110 may recategorize a subset of the indeterminate pixels as background pixels based at least in part on the subset of indeterminate pixels being closer to the one or more background pixels than to the one or more foreground pixels according to the chromatic-spatial distance metric.

After recategorizing the subset of the indeterminate pixels as background pixels, systems and methods described herein may produce an alpha matte 160 of the foreground subject of image 152 (by, e.g., extracting the foreground subject pixels and excluding the background pixels, including, e.g., the newly recategorized background pixels). As may be appreciated, alpha matte 160 may be used in one or more visual effects processes to edit video 150 and/or to use elements of video 150 (such as the foreground subject) in another video.

In addition, modules 102 may repeat the operations described above. For example, after processing image 152, modules 102 may process another (e.g., the next or the previous) frame of video 150. In some examples, some data produced when processing image 152 may be used when processing subsequent frames.

Figure 2:
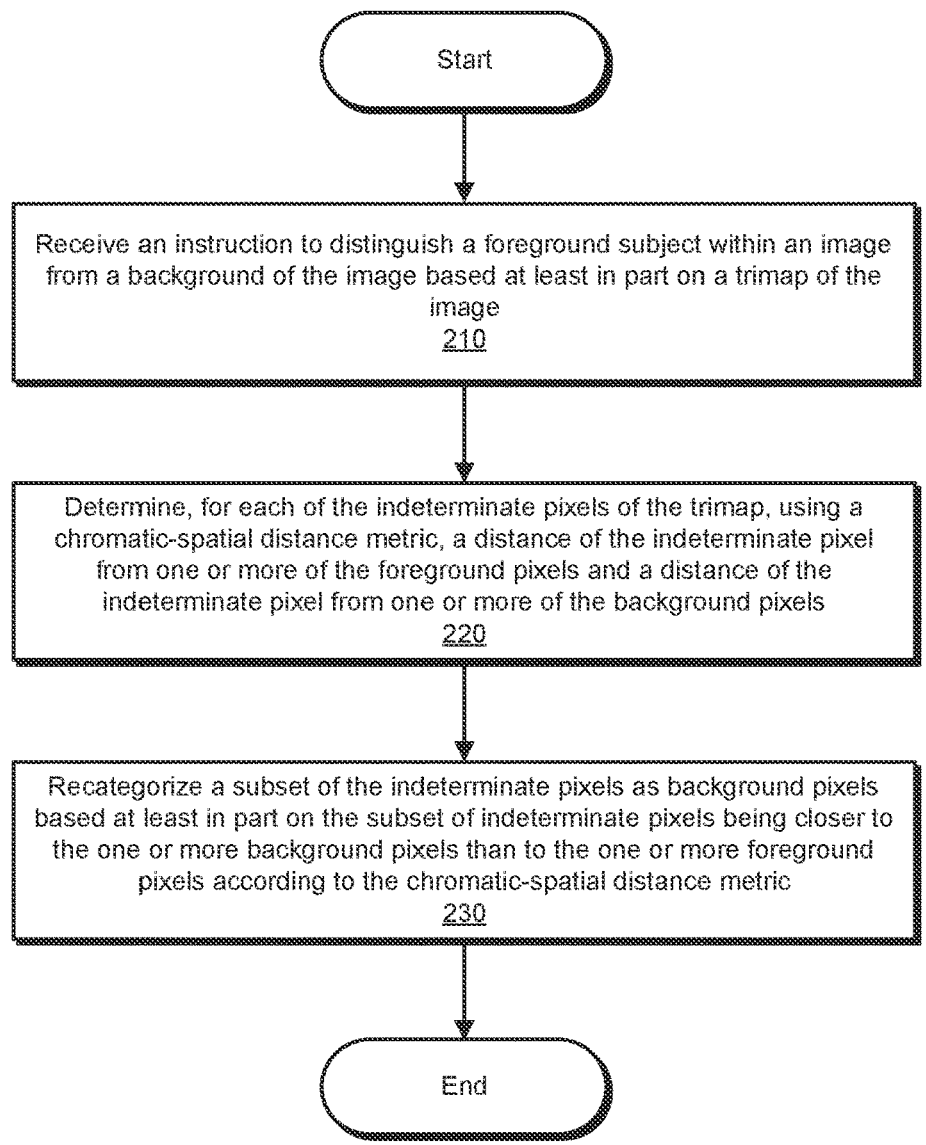
FIG. 2 is a flow diagram of an exemplary method for automated video matting.

FIG. 2 is a flow diagram of an exemplary computer-implemented method 200 for automated video matting. The steps shown in FIG. 2 may be performed by any suitable computer-executable code and/or computing system, including computer system 100 illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210 one or more of the systems described herein may receive an instruction to distinguish a foreground subject within an image from a background of the image based at least in part on a trimap of the image. The trimap may include a categorization of one or more pixels of the image as foreground pixels, background pixels, and/or indeterminate pixels.

The systems described herein may perform step 210 in any suitable context. For example, these systems may receive an image and a trimap of the image as input. The trimap may come from any of a variety of sources. For example, these systems may first receive an image and an initial mask of the subject (e.g., distinguishing estimated foreground pixels from the background of the image) as input. These systems may then receive user input defining the intermediate pixels. By recategorizing foreground pixels and/or background pixels within the initial mask as intermediate pixels, and/or by supplementing the categorizations provided by the initial mask with the user input categorizing certain pixels as intermediate pixels, these systems may produce the trimap.

In some examples, the systems described herein may automatically produce the trimap. For example, these systems may produce the trimap from the image and the initial mask of the image. In one example, these systems may provide the image and the initial mask of the image as input to a machine learning model. The systems described herein may use an existing machine learning model and/or train the machine learning model. The machine learning model may be trained on a corpus of images, subject masks, and trimaps. In some examples, the corpus may relate to subject masks that were successfully produced from corresponding images and trimasks. Since the subject masks in the corpus may all be validated, and since the trimasks of the corpus may have contributed to the successful production of the subject masks, the data of the corpus may be reliably used to train the machine learning model to identify trimasks that are suitable for a given image/subject mask pair. The corpus may be derived from any suitable source. For example, the corpus may be derived from one or more computer vision research databases. In some examples, the corpus may be built and/or contributed to from one or more of the processes described herein. For example, when the systems and methods described herein successfully produce an alpha matte from an image and a trimask, these systems and methods may add the alpha matte, image, and trimask to the corpus (and, e.g., update the machine learning model with the new sample).

In some examples, the systems described herein may automatically generate the trimask from the initial mask of the subject using erosion and dilation operations. As used herein, the term "erosion" may refer to any morphological image processing operation that reduces a shape of an image (e.g., a mask and/or an image defined by a mask). For example, an erosion operation may remove pixels from the boundary of the mask. As used herein, the term dilation may refer to any morphological image processing operation that extends the shape of an image (e.g., a mask and/or an image defined by a mask). For example, a dilation operation may add pixels around the boundary of the mask. Thus, for example, the systems described herein may generate a dilated version of the initial mask and an eroded version of the initial mask. By subtracting the eroded version of the initial mask from the dilated version of the initial mask, these systems may effectively create a "thick" or "fuzzy" boundary around the edge of the mask. These systems may use this "thick" boundary as the indeterminate pixels for the trimask.

As mentioned above, in some examples the systems described herein may use an initial mask of the subject to generate the trimap. In some further examples, the systems described herein may generate the initial mask. For example, the systems described herein may receive user input identifying at least one pixel of the foreground subject. These systems may generate the initial mask using an interactive segmentation process based at least in part on the user input. In some examples, the interactive segmentation process may use a deep neural network that takes an image and one or more pixel selections as input and generates a subject mask as output. The user input may take any suitable form. For example, the user may select (e.g., click on) one or more pixels within the subject to indicate the subject. In some examples, the user may click on one or more pixels within the background to indicate the background. In some examples, the user may identify a set of pixels with a "scribble" input. In some examples, the user may iteratively add inputs indicating the subject and/or the background, see the resulting proposed subject mask, and iterate with additional inputs until the mask looks substantially correct (e.g., apart from fine details at the boundaries of the subject).

Following generating the initial mask, in some examples the systems described herein may propagate the mask to the subject in other (e.g., subsequent or previous) frames of the video. For example, these systems may use a video object segmentation process to propagate the mask to the subject in other frames. In some examples, these systems may use a modular interactive video object segmentation process.

Returning to the context in which step 210 is performed, in some examples the image may be individually selected by the user. In some examples, the image may be automatically selected (e.g., based on belonging to a range of frames selected by the user and/or based on being proximate to another frame already processed by the systems described herein). Thus, the instruction may come in any of a variety of forms, including an input from the user, a procedure call, and/or the execution of a subsequent computer-executable instruction.

Returning to FIG. 2, at step 220 one or more of the systems described herein may determine, for each of the indeterminate pixels of the trimap, using a chromatic-spatial distance metric, a distance of the indeterminate pixel from one or more of the foreground pixels and a distance of the indeterminate pixel from one or more of the background pixels. As mentioned earlier, the chromatic-spatial distance metric may aggregate a color distance and a spatial distance.

The chromatic-spatial distance metric may aggregate the color distance and the spatial distance in any suitable way. For example, the chromatic-spatial distance metric may be based on a sum of the color distance and the spatial distance. In some examples, the color distance and the spatial distance may each be weighted. In some examples, the systems described herein may assign predetermined weights to the color distance and the spatial distance. Additionally or alternatively, these systems may dynamically adjust the weights based on user feedback. For example, as will be explained in greater detail below, in some examples a user may reject a categorization of certain indeterminate pixels as background pixels. In these examples, the systems described herein may adjust the weights of the color distance and/or the spatial distance in a direction closer to what would have yielded a correct categorization (in light of the user feedback) for use in categorizing indeterminate pixels in subsequent frames of a video. Additionally or alternatively, these systems may use a supervised machine learning process to determine the weights of the color distance and the spatial distance. In some examples, the systems described herein may (e.g., via a machine learning model) set the weights of the color distance and/or the spatial distance based at least in part on an extracted feature of the image. The systems described herein may use any suitable extracted feature to determine the weights of the color distance and/or spatial distance. Examples of extracted image features include, without limitation, portrayal of a daytime or nighttime environment, image saturation, image contrast, image sharpness, presence of one or more people, etc.

As mentioned earlier, in some examples the systems described herein may use a reduced set of colors in place of the actual colors of the indeterminate pixels when determining the color distance (and, thus, the chromatic-spatial distance) between indeterminate pixels and other pixels. In some examples, the systems described herein may generate the reduced set of colors. For example, these systems may use an unsupervised clustering method on the colors of the set of indeterminate pixels and derive the reduced set of colors from the resulting clusters (e.g., one color in the reduced set for each cluster). Thus, each indeterminate pixel may be regarded as having the representative color from the cluster to which the actual color of the indeterminate pixel belongs. Systems described herein may determine the representative color for each cluster in any suitable manner. For example, these systems may use the centroid of each cluster as the representative color for that cluster. Thus, the systems described herein may select the reduced set of colors by selecting the centroids of the clusters resulting from the unsupervised clustering method. Using a reduced set of colors when determining the color distance may reduce potential overfitting based on small variations in color. In addition, a reduced color set may allow a user to more quickly and easily provide feedback to the system regarding which colors to include or exclude from the foreground and/or background.

The systems described herein may use any suitable unsupervised clustering method. For example, these systems may use a density-based spatial clustering of applications with noise ("DBSCAN") clustering method. In some examples, these systems may use a hierarchical DBSCAN ("HDBSCAN") clustering method. Additionally or alternatively, these systems may use a generalized DBSCAN ("GDBSCAN") clustering method.

The systems described herein may measure the indeterminate pixels against any suitable foreground and background pixels. In some examples, these systems may determine which foreground (e.g., non-indeterminate) pixel is "closest" (by the chromatic-spatial distance metric) and which background (e.g., non-indeterminate) pixel is "closest" to the indeterminate pixel. As mentioned earlier, in some examples the trimap may preserve weights and/or probabilities that relate to estimates of whether a pixel is a foreground or a background pixel. In these examples, the systems described herein may require the weight or probability to meet a threshold (e.g., 95% or higher, 99% or higher, 100%, etc.) before including the foreground or background pixel as a candidate "closest" pixel. Such a threshold may be set in any suitable manner. For example, the threshold may be hardcoded. In some examples, the threshold may be adjustable by a user (e.g., within a graphical interface using a slider element, and, in some examples, providing live previews to the user of how the threshold affects the classification of pixels). In another example, an adaptive algorithm, such as a supervised learning method, may automatically adjust the threshold based on historical user input indicating that past thresholds had resulted in over- or under-inclusion of indeterminate pixels as foreground pixels. Additionally or alternatively, the above-mentioned weights may be used to discount the "closeness" of the pixel (e.g., a foreground pixel with a certainty weight of 95% may, inter alia, be considered closer to an indeterminate pixel than a foreground pixel with a certainty weight of 80%).

In some examples, the systems described herein may determine the k-closest (e.g., 3-closest, 10-closest, etc.) foreground pixels and average their distance from an indeterminate pixel. Likewise, these systems may determine the k-closest background pixels and average their distance from the indeterminate pixel.

Returning to FIG. 2, at step 230 one or more of the systems described herein may recategorize a subset of the indeterminate pixels as background pixels based at least in part on the subset of indeterminate pixels being closer to the one or more background pixels than to the one or more foreground pixels according to the chromatic-spatial distance metric.

In some examples, the systems described herein may recategorize the indeterminate pixels based on one or more additional factors beyond the relative closeness of the indeterminate pixels to foreground and background pixels. For example, these systems may preview to a user the results of the recategorizations. In some examples, these systems may provide one or more options for the user to modify the proposed recategorizations. For example, these systems may present the user with one or more colors from the reduced color set that represent colors of at least one indeterminate pixel to be removed (i.e., categorized as background rather than foreground). The user then may provide input to exclude a color from the removal process. The systems described herein may then except indeterminate pixels of colors within the color cluster indicated by the user when recategorizing the indeterminate pixels. In another example, the user may provide input to include a color in the removal process (i.e., designate indeterminate pixels corresponding to the selected color as background pixels).

In addition, when the user provides input directing the systems described herein regarding how to categorize one or more indeterminate pixels, these systems may apply that user input to future recategorizations (e.g., of other frames involving the same subject in the same video). Thus, for example, the systems described herein may weight against excluding indeterminate pixels of a color that belongs to the color cluster excluded by the user. In some examples, the user's feedback may be provided to a machine learning model, which may learn which colors (e.g., involving the subject and proximate to certain frames) are likely a part of the subject and not a part of the background.

Figure 3:
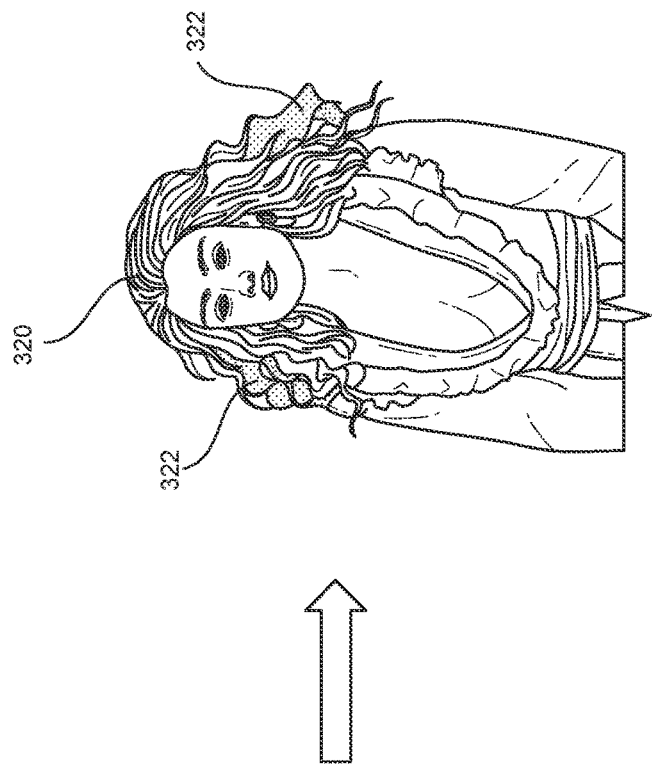
FIG. 3 is an illustration of an exemplary automated video matting process.
Figure 3:
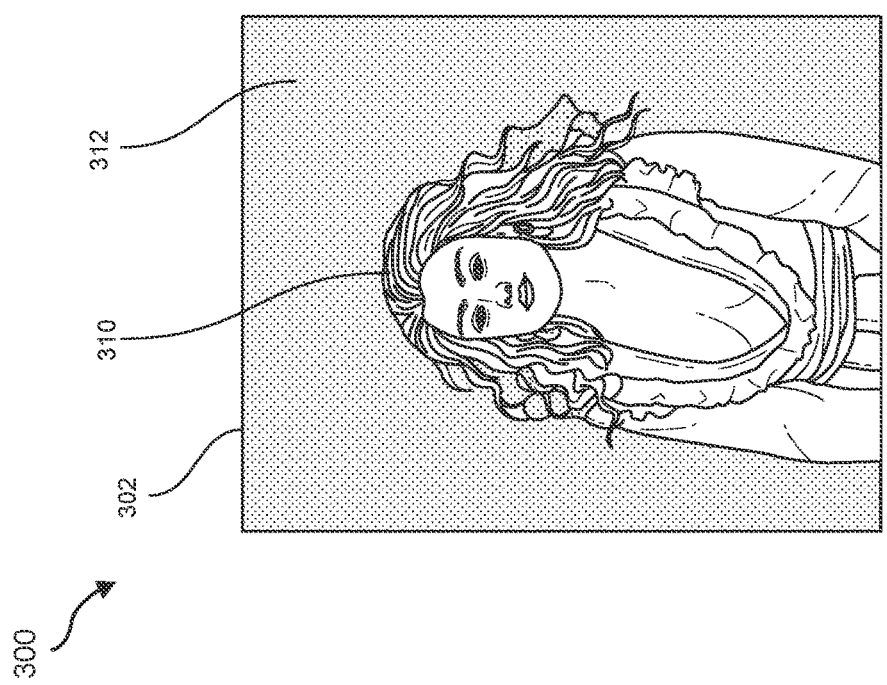

FIG. 3 is an illustration of an exemplary automated video matting process 300. As shown in FIG. 3, an image 302 may include a foreground subject 310 and a background 312. A semi-automated segmentation process may successfully classify the majority of the pixels of image 302 between foreground and background pixels, resulting in an isolated subject matte 320. However, residual background pixels, such as those in regions 322, may be incorrectly included in subject matte 320, at least partly due to the difficulty of properly segmenting around fine details such as hair. Furthermore, manually correcting subject matte 320 by manually removing background pixels (e.g., from regions 322) may be a time- and labor-intensive process and prone to error.

Figure 4:
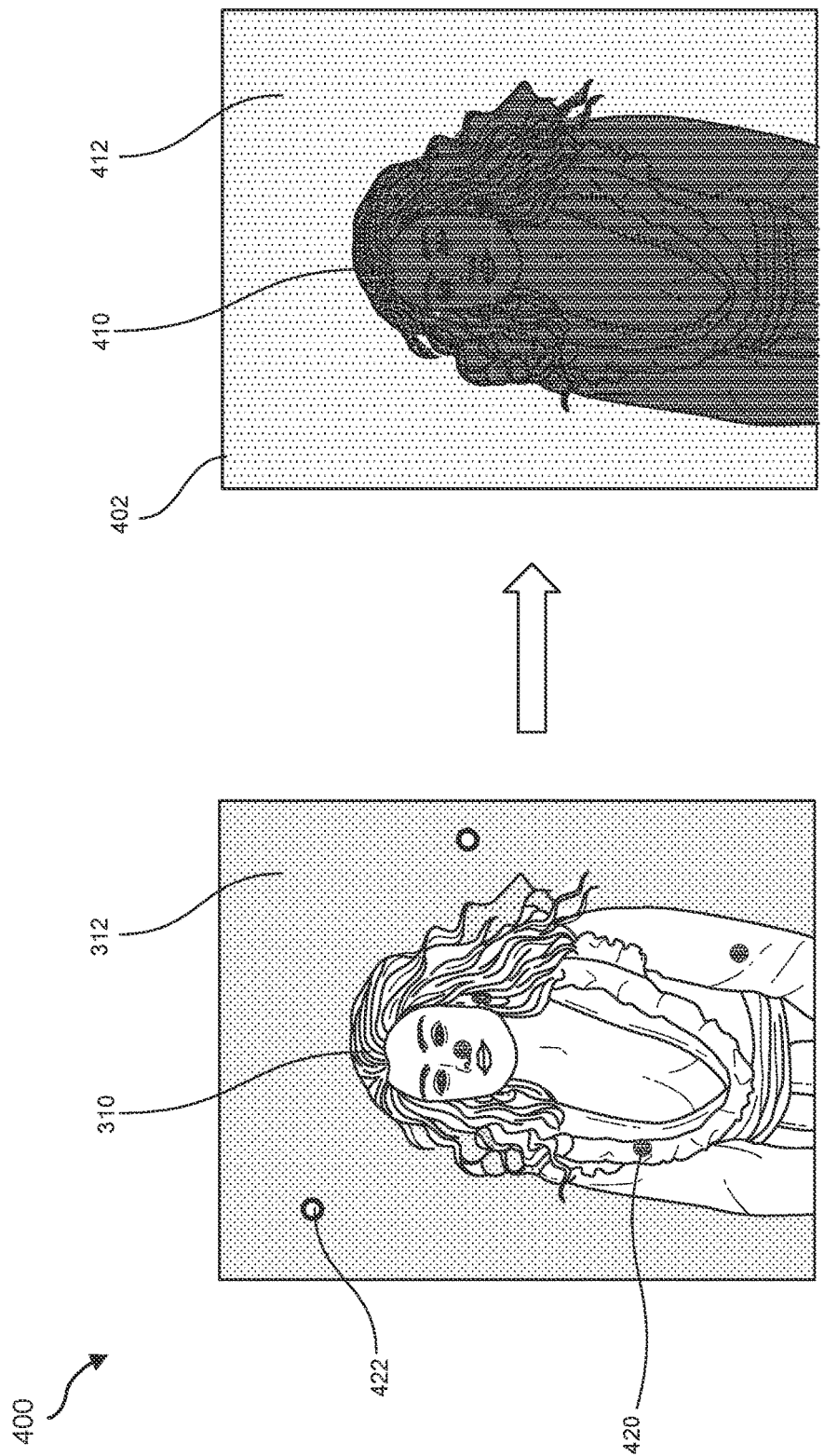
FIG. 4 is an illustration of an exemplary semi-automated rotoscoping process.

FIG. 4 is an illustration of an exemplary semi-automated rotoscoping process 400. As shown in FIG. 4, systems described herein may present image 302 to a user. The user may interactively provide input identifying one or more foreground points 420 that form a part of subject 310, and one or more background points 422 that form a part of background 312. These systems may then perform a segmentation operation based on the user input, resulting in a mask 402 identifying subject portion 410 and background portion 412.

Figure 5:
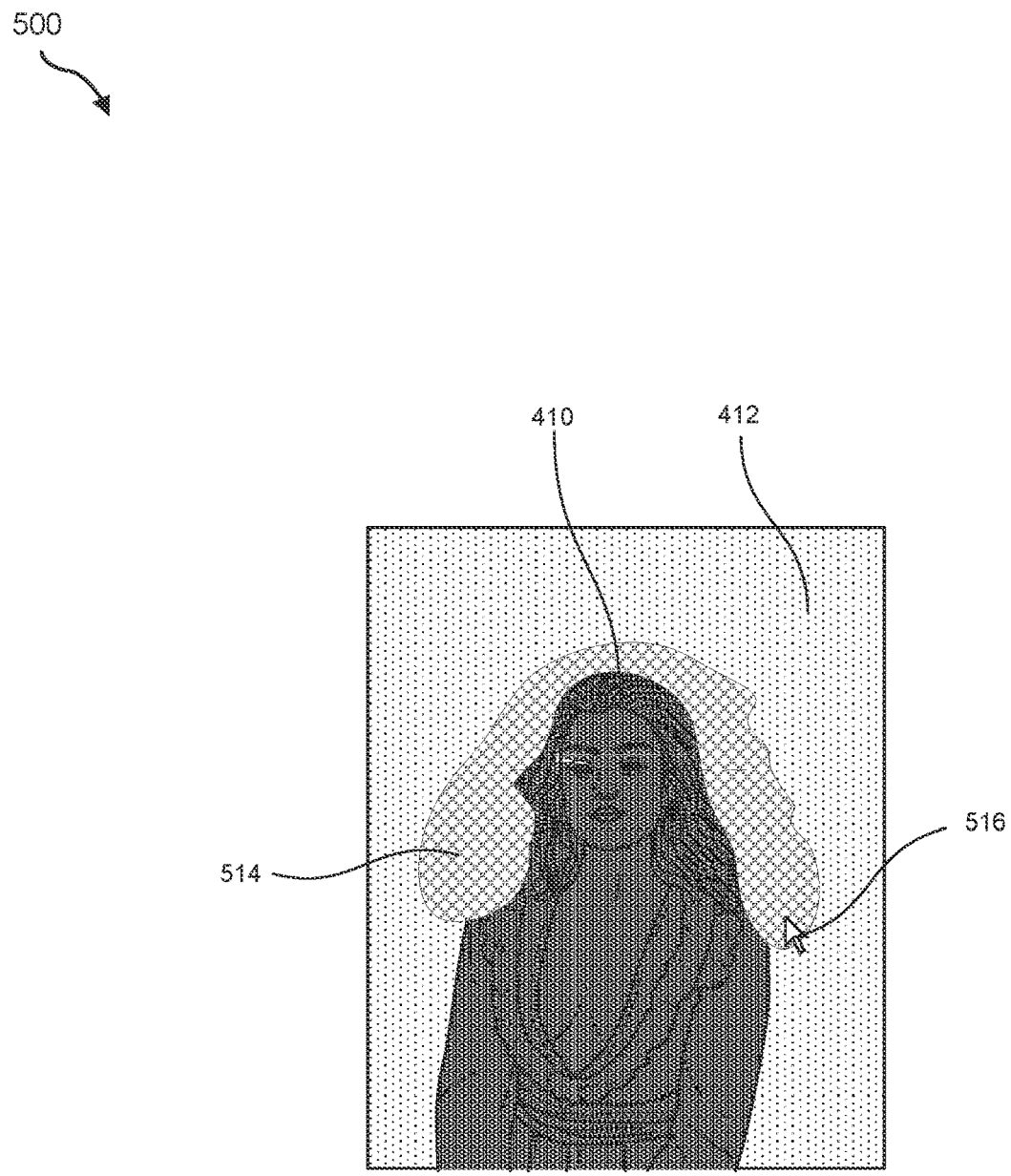
FIG. 5 is an illustration of an exemplary trimap creation process.

FIG. 5 is an illustration of an exemplary trimap creation process 500. As shown in FIG. 5, a user may draw (e.g., with a scribble gesture using a cursor 516) a region of indeterminate pixels 514. The systems described herein may compose a trimap from subject portion 410, background portion 412, and region of indeterminate pixels 514.

Figure 6:
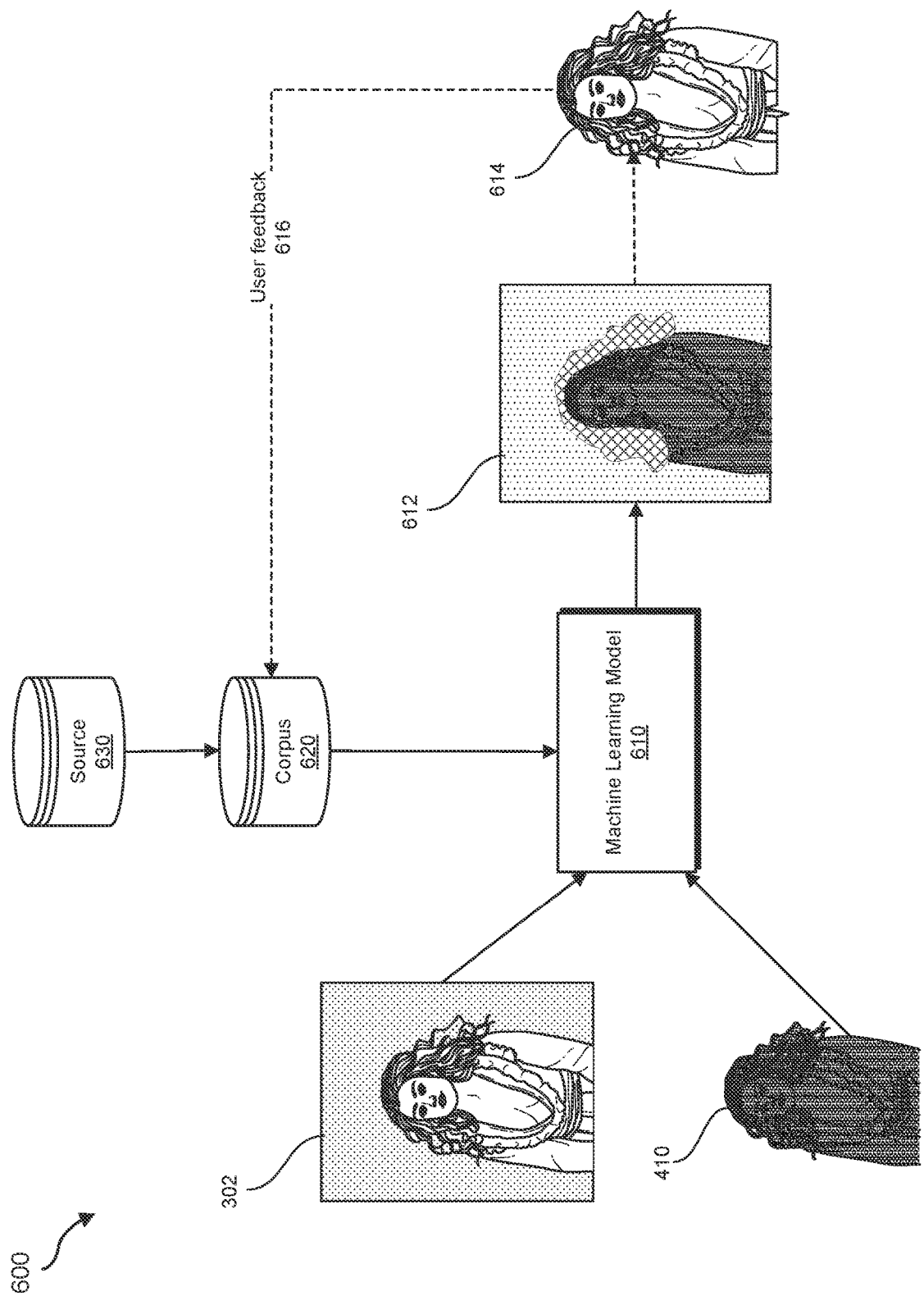
FIG. 6 is an illustration of another exemplary trimap creation process.

FIG. 6 is an illustration of an exemplary trimap creation process 600. As shown in FIG. 6, systems described herein may provide image 302 and subject mask 410 as input to machine learning module 610. Machine learning module 610 may be trained on a corpus 620 of known-good image/subject mask/trimap triplets (e.g., to produce a trimap from a given image/subject mask pair). In some examples, at least some of corpus 620 may derive from a source 630 external to the systems described herein. Machine learning model 610 may thus produce a trimap 612.

In addition, in some examples, the systems described herein may produce an alpha matte 614 from image 302 and trimap 612. User feedback 616 may indicate that alpha matte 614 is accurate. The systems described herein may therefore determine that image 302, alpha matte 614, and trimap 612 are a known good triplet, and provide them as a triplet to corpus 620.

Figure 7:
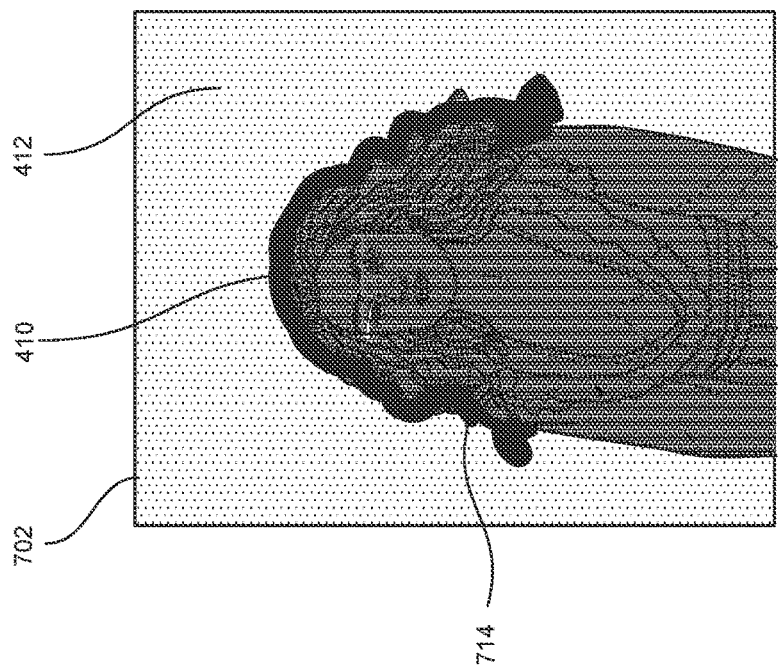
FIG. 7 is an illustration of another exemplary trimap creation process.

FIG. 7 is an illustration of another exemplary trimap creation process 700. As shown in FIG. 7, systems described herein may add a region 714 of indeterminate pixels to create a trimap 702 in conjunction with subject mask 410 and background 412. For example, these systems may perform a dilation operation to generate a dilated version of subject mask 410 to generate a dilated version. These systems may also perform an erosion operation to generate an eroded version of subject mask 410. These systems may then subtract the eroded version of the subject mask 410 from the dilated version of subject mask 410, thereby generating region 714.

Figure 8:
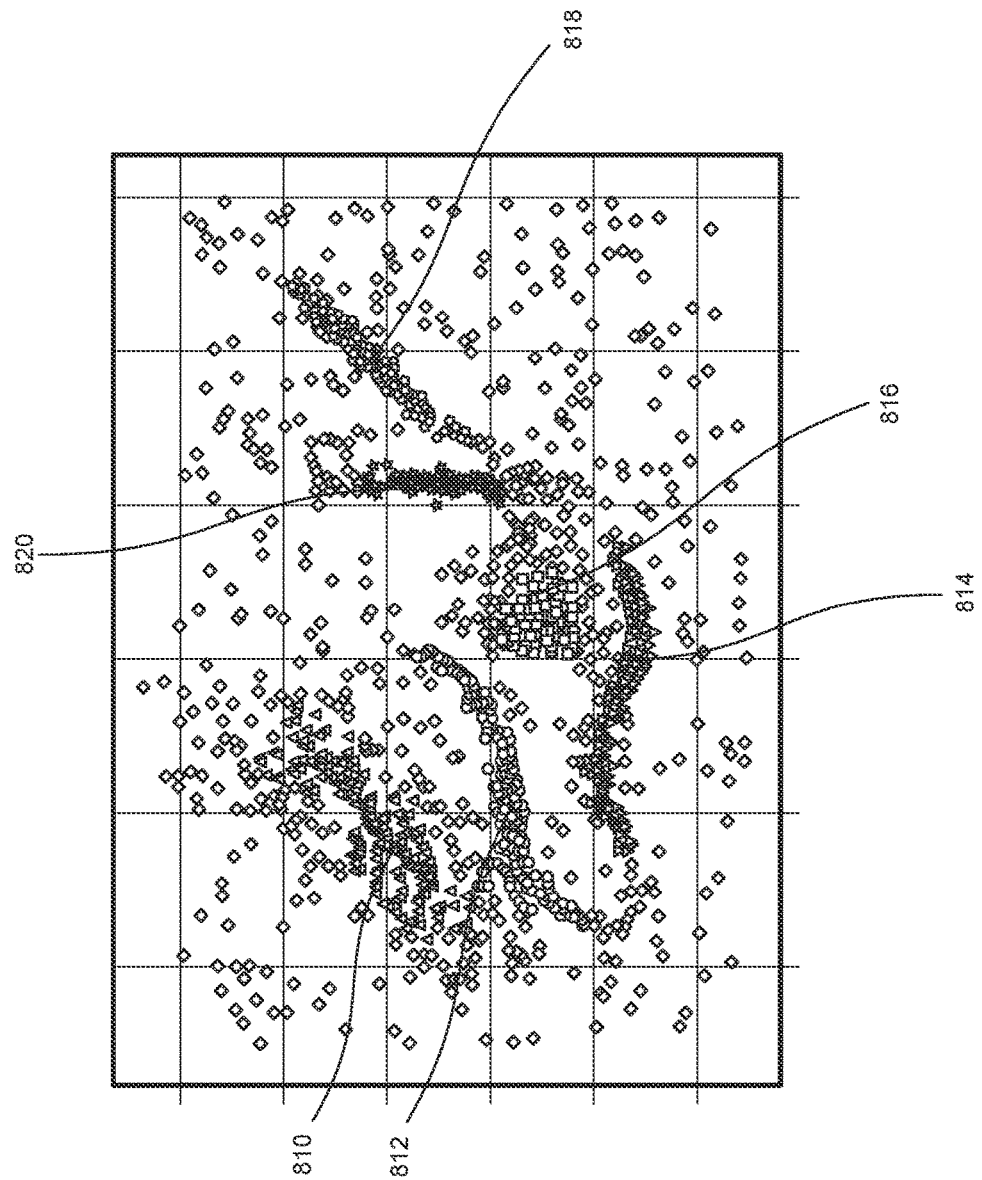
FIG. 8 is an illustration of an exemplary color clustering technique.

FIG. 8 is an illustration of an exemplary color clustering technique 800. As shown in FIG. 8, systems described herein may cluster colors of the indeterminate pixels, forming clusters 810, 812, 814, 816, 818, and 820. Some clusters may tend to represent foreground subject colors, and some clusters may tend to represent background colors. Systems described herein may compare indeterminate pixels with foreground and background pixels, using a distance metric that is based on the centroids of the clusters to which each indeterminate pixel corresponds, to determine whether to recategorize an indeterminate pixel as a foreground pixel or a background pixel.

FIG. 9 is an illustration of an exemplary user interface 900 for automated video matting. As shown in FIG. 9, interface 900 may show a user a "before" image 910 of the subject (e.g., without removing indeterminate pixels estimated to be background pixels) and a preview image 930 of the subject showing the removal of estimated background pixels. In addition, user interface 900 may show colors 922, 924, and 926, each color representing a color in a reduced color set corresponding to indeterminate pixels estimated to be background pixels. In FIG. 9, color 924 is represented as being excluded, based on user input, from the colors to be subtracted (e.g., by the icon 928). For example, the background may mostly be shades of red, and colors 922, 924, and 926 may be shades of red. However, color 924 may correspond to the redness of the subject's lipstick, and so should not be excluded from the image of the subject.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive an image to be transformed, transform the image, output a result of the transformation to produce an alpha matte, use the result of the transformation to perform a visual effects operation, and store the result of the transformation to create a video modified by visual effects. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising".

What is claimed is:

1. A computer-implemented method comprising:
   receiving an instruction to distinguish a foreground subject within an image from a background of the image based at least in part on a trimap of the image, the trimap comprising:
      a categorization of one or more pixels of the image as foreground pixels;
      a categorization of one or more pixels of the image as background pixels; and
      a categorization of one or more pixels of the image as indeterminate pixels;
   determining, for each of the indeterminate pixels, using a chromatic-spatial distance metric, a distance of the indeterminate pixel from one or more of the foreground pixels and a distance of the indeterminate pixel from one or more of the background pixels, the chromatic-spatial distance metric aggregating a color distance and a spatial distance and assigning a first weight to the color distance and a second weight to the spatial distance; and
   recategorizing a subset of the indeterminate pixels as background pixels based at least in part on the subset of indeterminate pixels being closer to the one or more background pixels than to the one or more foreground pixels according to the chromatic-spatial distance metric.

2. The computer-implemented method of claim 1, further comprising clustering the indeterminate pixels by color into a reduced set of colors;
   wherein the chromatic-spatial distance metric is based on the reduced set of colors rather than actual colors of the indeterminate pixels.

3. The computer-implemented method of claim 2, wherein recategorizing the subset of indeterminate pixels as background pixels is further based on user input to designate indeterminate pixels corresponding to a selected color from the reduced set of colors as background pixels.

4. The computer-implemented method of claim 3,
   wherein the image comprises a first frame within a video;
   further comprising recategorizing an additional subset of indeterminate pixels from a second frame of the video that is subsequent to the first frame based at least in part on the user input provided with respect to the first frame.

5. The computer-implemented method of claim 1, wherein the first weight and the second weight are set based at least in part on a machine learning model trained on a feature extracted from the image.

6. The computer-implemented method of claim 1, further comprising:
   identifying an initial mask defining the foreground subject within the image; and
   generating the trimap based at least in part on the initial mask and the image.

7. The computer-implemented method of claim 6, wherein generating the trimap based at least in part on the initial mask and the image comprises providing the initial mask and the image as input to a machine learning model, wherein the machine learning model is trained on a corpus of samples, each sample comprising a sample image, a sample alpha matte, and a sample trimap.

8. The computer-implemented method of claim 6, wherein identifying the initial mask defining the foreground subject within the image comprises:
receiving user input identifying at least one pixel of the foreground subject; and
generating the initial mask using an interactive segmentation process based at least in part on the user input.

9. The computer-implemented method of claim 8,
further comprising receiving additional user input identifying at least one pixel of the background;
wherein the interactive segmentation process is further based at least in part on the additional user input.

10. A system comprising:
at least one physical processor; and
physical memory comprising computer-executable instructions that, when executed by the physical processor, cause the physical processor to:
receive an instruction to distinguish a foreground subject within an image from a background of the image based at least in part on a trimap of the image, the trimap comprising:
a categorization of one or more pixels of the image as foreground pixels;
a categorization of one or more pixels of the image as background pixels; and
a categorization of one or more pixels of the image as indeterminate pixels;
determine, for each of the indeterminate pixels, using a chromatic-spatial distance metric, a distance of the indeterminate pixel from one or more of the foreground pixels and a distance of the indeterminate pixel from one or more of the background pixels, the chromatic-spatial distance metric aggregating a color distance and a spatial distance and assigning a first weight to the color distance and a second weight to the spatial distance; and
recategorize a subset of the indeterminate pixels as background pixels based at least in part on the subset of indeterminate pixels being closer to the one or more background pixels than to the one or more foreground pixels according to the chromatic-spatial distance metric.

11. The system of claim 10, wherein the computer-executable instructions further cause the physical processor to cluster the indeterminate pixels by color into a reduced set of colors;
wherein the chromatic-spatial distance metric is based on the reduced set of colors rather than actual colors of the indeterminate pixels.

12. The system of claim 11, wherein recategorizing the subset of indeterminate pixels as background pixels is further based on user input to designate indeterminate pixels corresponding to a selected color from the reduced set of colors as background pixels.

13. The system of claim 12,
wherein the image comprises a first frame within a video;
wherein the computer-executable instructions further cause the physical processor to recategorize an additional subset of indeterminate pixels from a second frame of the video that is subsequent to the first frame based at least in part on the user input provided with respect to the first frame.

14. The system of claim 10, wherein the first weight and the second weight are set based at least in part on a machine learning model trained on a feature extracted from the image.

15. The system of claim 10, wherein the computer-executable instructions further cause the physical processor to:
identify an initial mask defining the foreground subject within the image; and
generate the trimap based at least in part on the initial mask and the image.

16. The system of claim 15, wherein generating the trimap based at least in part on the initial mask and the image comprises providing the initial mask and the image as input to a machine learning model, wherein the machine learning model is trained on a corpus of samples, each sample comprising a sample image, a sample alpha matte, and a sample trimap.

17. The system of claim 15, wherein identifying the initial mask defining the foreground subject within the image comprises:
receiving user input identifying at least one pixel of the foreground subject; and
generating the initial mask using an interactive segmentation process based at least in part on the user input.

18. A non-transitory computer-readable medium comprising one or more computer-executable instructions that, when executed by at least one processor of a computing device, cause the computing device to:
receive an instruction to distinguish a foreground subject within an image from a background of the image based at least in part on a trimap of the image, the trimap comprising:
a categorization of one or more pixels of the image as foreground pixels;
a categorization of one or more pixels of the image as background pixels; and
a categorization of one or more pixels of the image as indeterminate pixels;
determine, for each of the indeterminate pixels, using a chromatic-spatial distance metric, a distance of the indeterminate pixel from one or more of the foreground pixels and a distance of the indeterminate pixel from one or more of the background pixels, the chromatic-spatial distance metric aggregating a color distance and a spatial distance and assigning a first weight to the color distance and a second weight to the spatial distance; and
recategorize a subset of the indeterminate pixels as background pixels based at least in part on the subset of indeterminate pixels being closer to the one or more background pixels than to the one or more foreground pixels according to the chromatic-spatial distance metric.

* * * * *